United States Patent [19]

Hansen

[11] 4,306,342
[45] Dec. 22, 1981

[54] METHOD OF MANUFACTURING A CRANK ARM FOR A WELDED CRANKSHAFT, AND A PRESSING EQUIPMENT FOR CARRYING OUT THE METHOD

[75] Inventor: Erik Hansen, Gentofte, Denmark

[73] Assignee: B & W Diesel A/S, Copenhagen, Denmark

[21] Appl. No.: 107,655

[22] Filed: Dec. 27, 1979

[30] Foreign Application Priority Data

Jan. 22, 1979 [DK] Denmark ............................ 266/79
Jul. 5, 1979 [DK] Denmark ........................... 2852/79

[51] Int. Cl.$^3$ ............................................ B21K 1/08
[52] U.S. Cl. ........................................ 29/6; 72/356; 72/358
[58] Field of Search ............... 72/356, 359, 412, 472; 29/6

[56] References Cited

U.S. PATENT DOCUMENTS

| | | | |
|---|---|---|---|
| 1,087,583 | 2/1916 | Hanen | 72/306 X |
| 2,256,726 | 9/1941 | Rynigill | 29/6 X |
| 2,378,686 | 6/1945 | Caretens | 29/6 X |
| 2,891,299 | 6/1959 | Pobra | 29/6 |
| 2,911,705 | 11/1959 | Bovert | 29/6 |
| 3,129,488 | 4/1964 | Pobra et al. | 29/6 |
| 4,041,755 | 8/1977 | Put | 72/356 |
| 4,061,013 | 12/1977 | Kuc | 72/356 |
| 4,078,415 | 3/1978 | Koch et al. | 72/356 |

OTHER PUBLICATIONS

Haller, "Das Schmieden von Kurbelwellen", *Werkstattstechnik und Maschinenbau*, Apr. 1953, pp. 147–151.

*Primary Examiner*—Leon Gilden
*Attorney, Agent, or Firm*—Bacon & Thomas

[57] ABSTRACT

For manufacturing a crank arm for a welded crankshaft a flat blank is gripped along its contour in a ring-shaped holder and is subjected to pressing forces acting perpendicular to the plane of the blank to produce, by extrusion, a crank pin stub and a journal pin stub projecting from opposite sides of the blank, respectively. Each stub can be extruded in two stages, the first of which results in a by and large axial material flow while the second stage produces a combined axial and radial expansion of the first formed stub to circular cylindrical shape. Simultaneously with the first extrusion a fillet merging smoothly into the stub is pressed into that lateral surface of the blank from which the stub is extruded. The fillet may extend continuously around the stub or alternatively it may be indented only along that part of the stub surface which is oriented towards the other stub.

A pressing equipment for carrying out the method comprises a stationary lower tool with a segmented ring which determines the contours of the stub formed by the extrusion and of the surrounding fillet. The equipment comprises two interchangeable upper tools each having a pressing mandrel arranged to produce, in cooperation with an anvil at the bottom of the ring a substantially axial and a combined axial and radial flow of material, respectively, within the extruded stub.

6 Claims, 6 Drawing Figures

METHOD OF MANUFACTURING A CRANK ARM FOR A WELDED CRANKSHAFT, AND A PRESSING EQUIPMENT FOR CARRYING OUT THE METHOD

BACKGROUND OF THE INVENTION

The present invention relates to a method of manufacturing a crank arm for a welded crankshaft, comprising providing a blank having two opposed, flat or substantially flat lateral surfaces, heating said blank to forging temperature and forming integral crank pin and journal pin stubs, respectively, by extruding material from the blank in opposite directions perpendicular to said lateral surfaces.

U.S. Pat. No. 2,403,049 discloses a method of this kind in which the flat blank is forged between two dies whereby there is formed a crank arm having two protruding stubs which at their root ends or bases merge directly into the respective lateral surfaces of the arm.

SUMMARY OF THE INVENTION

According to the invention there is provided a method of the kind referred to above characterized by the feature that in connection with the extrusion of either stub a depression having a smoothly curved cross-section is press-forged into the adjoining lateral surface of the blank concentric with said stub, which depression extends along the surface of the stub through an angle of at least 60° to either side of the line connecting the centers of the two stubs and merges smoothly into the surface of the stub.

With this method there is obtained a high local compression and closing of pores in that zone of the blank which adjoins the press-forged depression, and which in the welded and finished crankshaft forms the transition or fillet between the arm and the adjoining crank or journal pin. This results in an improved mechanical strength of this highly loaded region of the crankshaft in which the stresses are typically 4 to 5 times as large as midway between the ends of the cylindrical pins. When the depression is formed, material flows into the extruded stub, and when the operation is carried out on a preforged or rolled blank, in which the grain extends in the plane of the blank, there is obtained a grain direction or flow approximately parallel to the surface of the arm within and at both sides of the fillet, even after the final machining of the crankshaft.

The advantages mentioned above will be obtained already with a limited extrusion, which produces only relatively low protruding stubs to which separately made crank and journal pins are subsequently welded. It is, however, possible to extrude stubs of such length that the stubs on two successive arms of the complete crankshaft can be welded directly together, similar to what is described in U.S. Pat. No. 2,403,049. In that case it is expedient to press-forge each depression simultaneously with a substantially axial extrusion of an associated stub and to subject each stub to a combined axial and radial expansion in a subsequent operation. By dividing up the extrusion into two successive operations there is obtained a particularly close approximation to a surface-parallel grain flow throughout the entire length of each stub and, hence, optimum strength properties of the finished crankshaft.

The invention also relates to a pressing equipment for carrying out the method, comprising first and second pressing tools relatively movable towards and away from one another. According to the invention the equipment is characterized in that on said first pressing tool there is provided a support face having a circular aperture therein corresponding to the stub to be extruded in response to movement of the tools towards one another, that at least along part of its circumference the internal surface of said aperture merges smoothly into a male die part protruding from the support face towards the second tool coaxially with the aperture and shaped with a smoothly curved, convex axial profile which at the outer circumference of the die part merges smoothly into the support face, and in that the second pressing tool is formed with a flat pressing surface located opposite said male die part.

In addition to the two pressing tools the equipment may comprise a ring-shaped holder for gripping the blank along the contour thereof. Besides preventing expansion of the blank in its own plane, whereby the material displaced by each male die part is forced to flow inwardly into the extruded stub, the holder provides a convenient means for manipulating the hot blank being worked upon.

In order to ensure uniform penetration of the male die part into the blank to the full depth along the entire circumference of the die part, the opposed flat pressing surface should protrude a suitable distance beyond the contour of the male die part. The surface may extend substantially to the inner contour of the ring-shaped holder and so far towards the other stub which already has been or which will subsequently be extruded from the blank, that it overlaps the annular or part-annular depression surrounding that other stub.

When each stub is to be extruded simultaneously with the press-forging of the surrounding depression, the second pressing tool may comprise an axially symmetric pressing mandrel protruding centrally of the flat pressing surface of that tool and coaxially with the male die part, said mandrel having a diameter substantially equal to the diameter of the opposed aperture in the first tool.

For supplementing the essentially purely axial extrusion flow created by said pressing mandrel with the above-mentioned combined axial and radial expansion of the extruded stub, the equipment may comprise a second, axially symmetric pressing mandrel to be used after the first pressing mandrel, said second pressing mandrel having diameters decreasing towards the first pressing tool, and an axially symmetric anvil recessed centrally of the aperture in the first pressing tool. By abutting against the end face of the stub the anvil ensures that the material within the central zone of the stub cannot be displaced axially by the advancing second pressing mandrel, and consequently the material displaced by that mandrel causes a radial expansion or enlargement of the free end of the stub and an increase of the total axial length of the stub. As a result, the length of the cylindrical stub, in which the grain extends parallel to the stub surface, becomes larger than obtainable in a single pressing operation.

The outer diameter of the anvil may be between 40 and 60% of the inner diameter of the surrounding aperture.

It is advantageous to shape the second pressing mandrel with a concave portion, the longitudinal profile of which is shaped substantially as an arc of a circle, which concave portion merges towards the free end of the mandrel into a slightly conical stem. With the concave portion of the mandrel there is obtained a corresponding curvilinear grain flow along the inner surface of the extruded hollow stub and, hence, a favourable smooth transition to the grain flow in the finished crank arm between the crank and journal pins.

The furthest protruding part of the axial profile of the male die part may be shaped as an arc of a circle which is concentric with the concave arcuate part of the longitudinal profile of the second pressing mandrel when the first and second pressing tools have performed their relative movements towards one another. With a set of pressing tools of this design the thickness of the material, which connects the stub and the arm, becomes constant in a section through the axis of the stub.

In a preferred embodiment the male die part protrudes from an externally conical support ring removably received in a lower pressing tool, the inner surface of said support ring forming the aperture into which a stub is to be extruded, said support ring being slit axially into at least two segments. With this embodiment it is possible to extrude an exactly cylindrical stub and, consequently, retain the surface-parallel grain flow therein to a maximum extent, also after machining of the stub. This is due to the fact that when the press-forged workpiece is removed from the lower tool, the support ring can be lifted together with the workpiece until the individual segments of the support ring are clear of the lower tool following which they are released from the stub due to their own weight.

BRIEF DESCRIPTION OF THE DRAWINGS

The invention will now be described in more detail with reference to the accompanying schematical drawings in which.

DETAILED DESCRIPTION

The schematically shown pressing equipment comprising a stationary lower pressing tool 1, a vertical movable upper pressing tool of which FIGS. 1-4 show only interchangeable pressing plungers 2 and 3, respectively, and a ring-shaped holder 4 for a blank 5 to be processed.

The stationary lower tool 1 comprises a platen or base 6, which in its upper face has a recess shaped as a truncated cone for receiving an externally conical and internally circular cylindric support ring 7. As seen in FIGS. 1-4 and 6, the support ring 7 is axially slit at three places of its circumference so that it consists of three identical segments 8 tightly abutting one another when the support ring is located in the recess. Immediately adjoining its cylindrical inner surface 9 the support ring is shaped as an upwardly extending male die ring 10, the axial cross-sectional profile of which, as shown, is defined by an arc of a circle, the inner end of which is tangent to the cylindrical surface 9 while its outer end merges, through a straight line, into a flat annular surface 11. When ring 7 is mounted in platen 6, surface 11 is flush with the flat upper face 12 of the platen.

Figure 1:
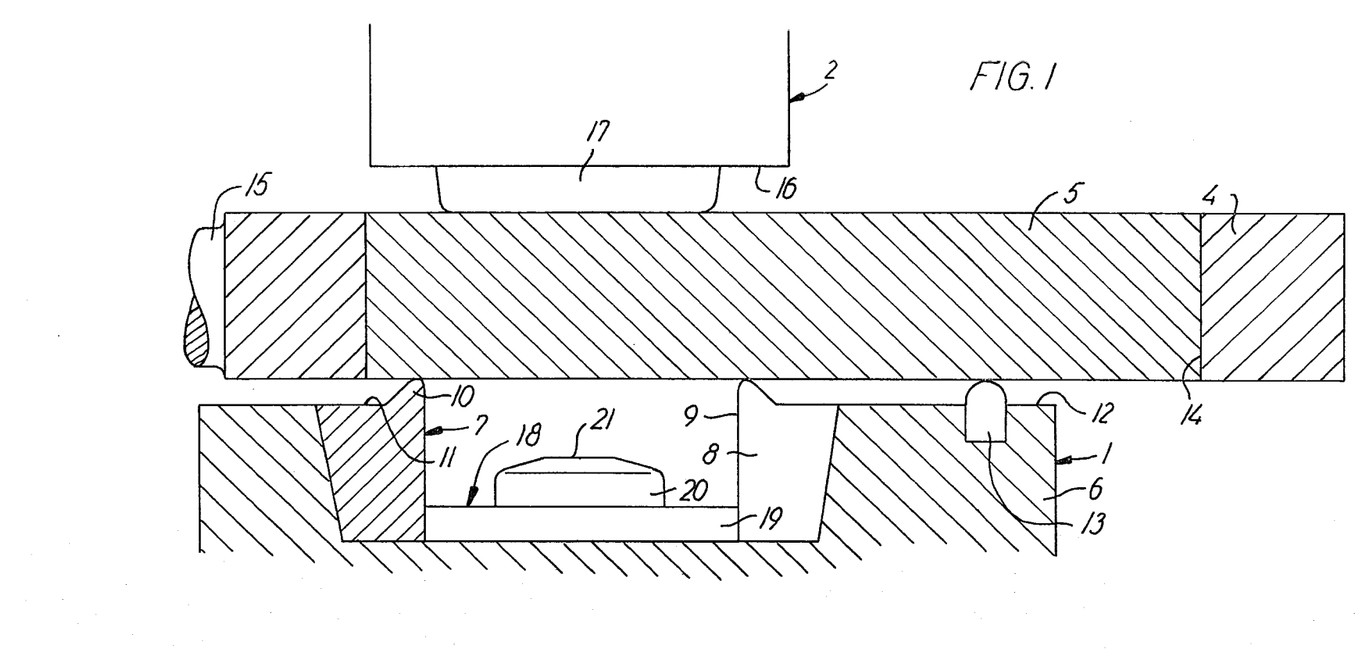
FIG. 1 is a vertical section through a pressing equipment embodying the invention, shown with a blank located in the ring-shaped holder of the equipment.

Recessed in surface 12 is a support pin 13, the upper, rounded end face of which is located at the same level as the upper edge of male die ring 10. The distance between the center lines of pin 13 and ring 7 is equal to the desired crank radius. As shown in FIG. 1 pin 13 serves as a supplementary support for blank 5 at the beginning of the first pressing operation.

The ring-shaped holder 4 is formed with an inner contour 14 corresponding to the desired contour of the press-forged crank arm. The thickness of the holder is equal to the thickness of blank 5. The holder may be provided with suitable means, shown schematically as a protruding lug 15, for facilitating the manipulation of the holder and the blank 5 retained therein during the pressing operations.

Blank 5 may be flame-cut from a forged or rolled steel slab with an outer contour such that after being heated to forging temperature it can relatively easily be inserted into holder 4 following which the first pressing operation described below causes it to be gripped so firmly in the holder that it can be handled together therewith. Alternatively, blank 5 can be made by forging a plate from a steel block or slab of predetermined weight, the final part of the forging being carried out with the blank mounted in the holder so that finally the blank is tightly held by the holder in contact therewith along the major part of contour 14.

In FIG. 1 blank 5, which is gripped in holder 4 and heated to forging temperature, is shown supported by male die ring 10 and support pin 13 immediately prior to the first pressing operation which is carried out by pressing plunger 2 secured to the platen (not shown) of the movable upper tool. Plunger 2 has a downwardly facing annular pressing surface 16 which surrounds a protruding, axially symmetric and slightly conical pressing mandrel 17, the diameter of which is by and large equal to the diameter of the cylindrical surface 9 of the lower tool.

An insert 18 is located in the bottom of the recess in platen 6 and comprises a circular flange 19 for centering the insert in support ring 7, and an upwardly extending, circular cylindric part 20 acting as an anvil during the extrusion of stubs from blank 5, as described below, when the upper end face 21 of part 20 is engaged by the end face of the extruded stub.

Figure 2:
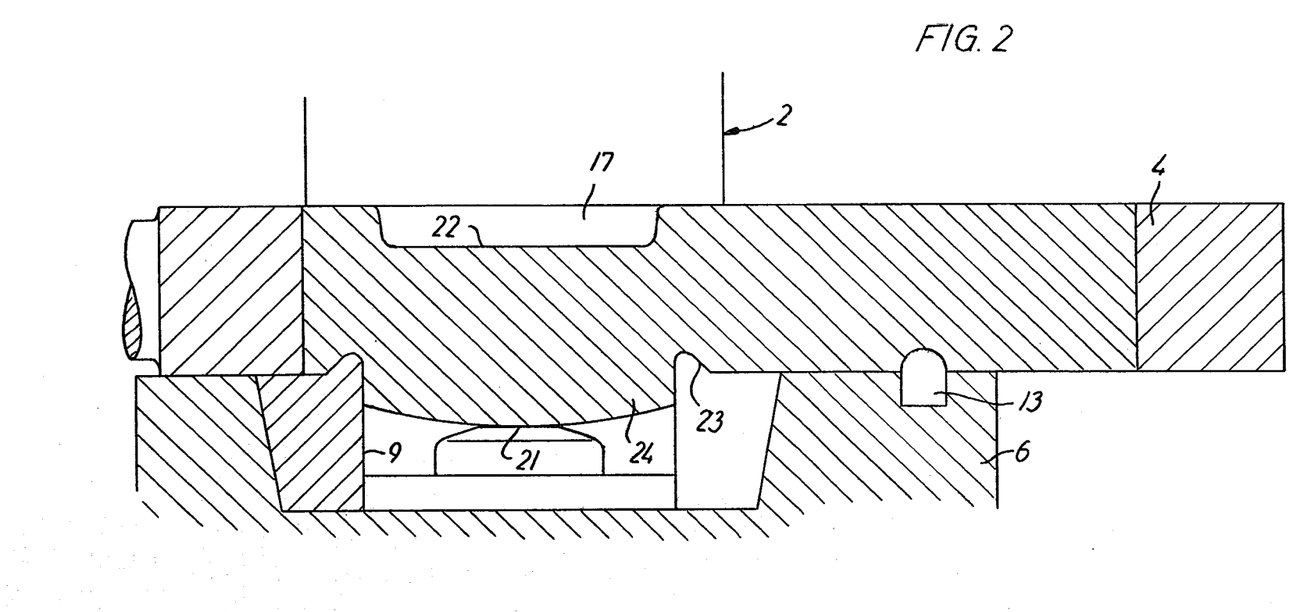
FIGS. 2-4 are corresponding sections showing the pressing equipment and the blank in successive stage of the reshaping of the blank into a crank arm.

FIG. 2 shows the blank and the tools at the end of the first pressing operation when the pressing surface 16 of plunger 2 abuts the upper surface of the blank while the lower blank surface abuts the aligned surfaces 11 and 12 of the lower tool. During the pressing operation mandrel 17 has formed a corresponding depression 22 in the upper surface of the blank while die ring 10 has formed a corresponding depression or indentation 23 in the lower surface of the blank. The material thus displaced has flown into ring 7 to form a provisional stub 24 projecting from the underside of the blank.

Figure 3:
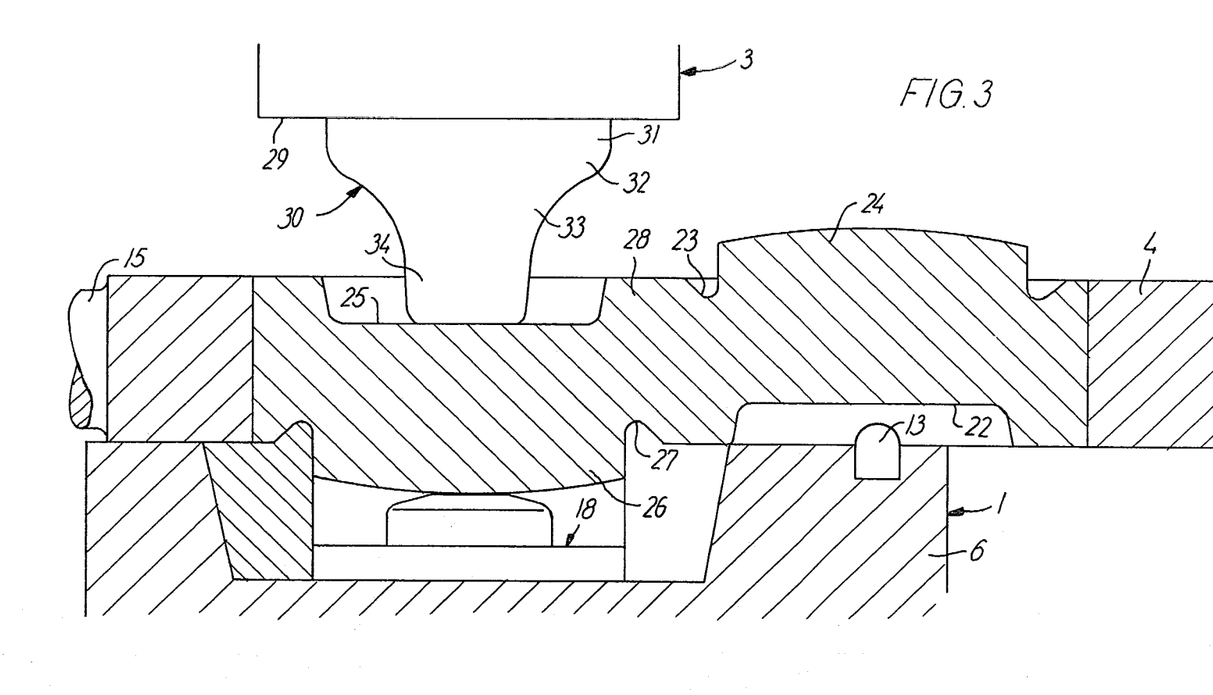

Plunger 2 is then lifted clear of the blank, and after holder 4 with the blank has been lifted clear of lower tool 1, the holder is rotated 180° about its longitudinal axis and shifted laterally so as to align the indentation produced by pin 13 with the center line of plunger 2. To facilitate the location of the blank, the lower face of mandrel 17 may be provided with a centrally projecting pin (not shown) corresponding to pin 13. By repeating the pressing operation described above there is produced a depression 25 in the upper surface of the blank and an opposed extruded stub 26 surrounded by an annular depression 27 in the lower blank surface, the stub 26 being spaced from the first extruded stub 24 by a distance corresponding to the desired distance between the center lines of the crank and journal pins in the finished crank arm. FIG. 3 shows a section through the reshaped blank or workpiece, now designated by 28, after completion of these two first pressing operations.

Figure 4:
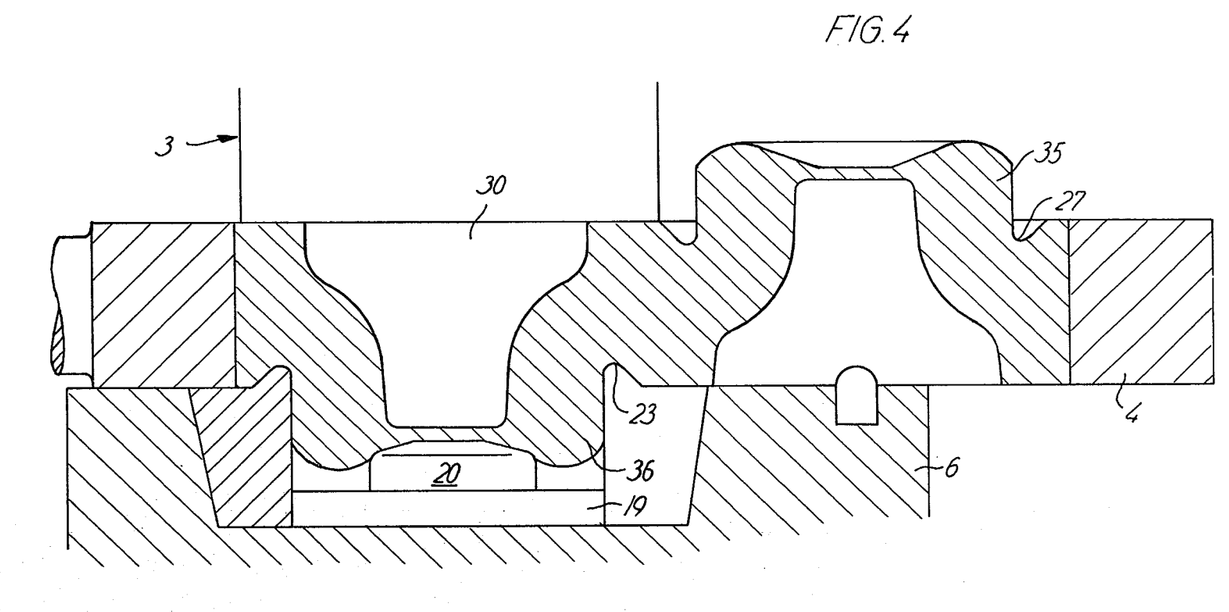

Pressing plunger 2 of the upper tool is now replaced by the second pressing plunger 3 shown in FIGS. 3 and 4, which has a downwardly facing pressing surface 29 corresponding to pressing surface 16 of the first pressing plunger and surrounding an axially symmetric pressing mandrel 30 formed with a slightly conical base 31 which through a convex portion 32, the longitudinal contour of which is an arc of a circle, continues in a concave portion 33, the longitudinal profile of which is also shaped as an arc of a circle. The concave mandrel portion 33 merges into a terminal, slightly conical stem 34.

From the position shown in FIG. 3 the second pressing operation occurs by a downward movement of the upper tool with plunger 3 until pressing surface 29 abuts the upper surface of workpiece 28. The upper tool is then lifted clear of the workpiece, which together with holder 4 is lifted clear of the lower tool and rotated as described above after the initial pressing operation, such that the surface of workpiece 28, which in FIG. 3 is facing upwardly, comes to rest against the surfaces 11, 12 of the lower tool with male die ring 10 engaging in the annular depression 23. The second pressing operation as just described is repeated, and after termination thereof the workpiece has assumed the shape shown in FIG. 4.

During each of the two final pressing operations mandrel 30 displaces the material of workpiece 28 located below the depressions 25 or 22, respectively, in a downward direction, but since the material flow in the axial direction is restrained by anvil 20, there occurs a substantial radial flow whereby the two provisional stubs 24 and 26 are not only elongated but are primarily expanded to engage the cylindrical surface 9 of the lower tool. Consequently, the ultimate or final stubs 35 and 36, except for their end portions, which are subsequently removed by machining, become circular cylindric with a grain flow parallel to the cylindrical surface. The initial press-forging of the annular depressions 23 and 27 by means of male die ring 10 ensures a corresponding surface-parallel grain flow at these places of the finished pressed crank arm designated by 37.

The center of the arc of a circle forming the longitudinal profile of the concave portion 33 of pressing mandrel 30 is preferably located such that in the end position of the pressing tools, as shown in FIG. 4, it coincides with the center of the circular arc shaped part of the profile of male die ring 10. It is advisable to let the downwardly facing surfaces 16 and 29 on pressing plungers 2 and 3 overlap the support surface 11 of the lower tool as much as practical. Their outer contour may be as shown by the dot-and-dash line 38 (see FIG. 6) which at the far right is determined by the requirement that the surface shall be clear of the adjoining stub extruded from the workpice.

Due to the cylindrical surface of stubs 35 and 36 the support ring 7 of lower tool will participate in the lifting of the workpiece together with holder 4, but because ring 7 is externally conical and composed of segments it will soon be disengaged from the recess in platen 6 so that the segments of the ring are released from the stub due to their own weight and drop back into place in the recess of the platen.

Figure 5:
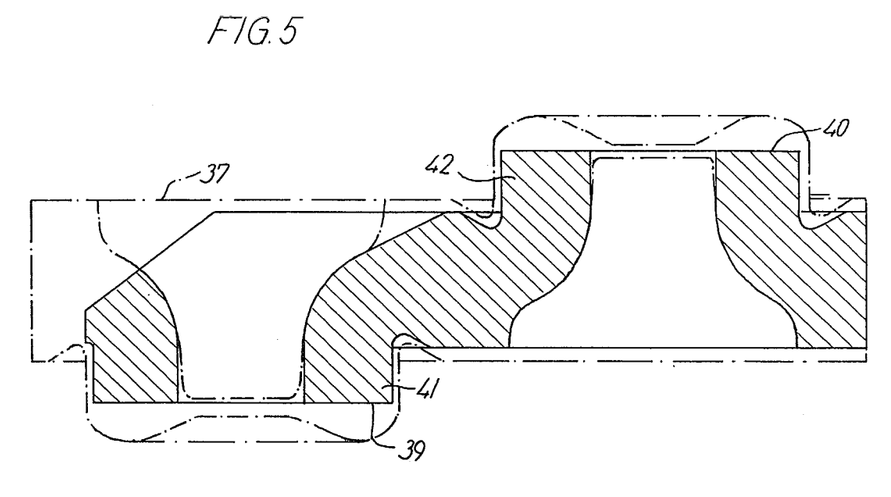
FIG. 5 is a corresponding section showing the crank arm ready for being welded to two similar crank arms after machining.
Figure 6:
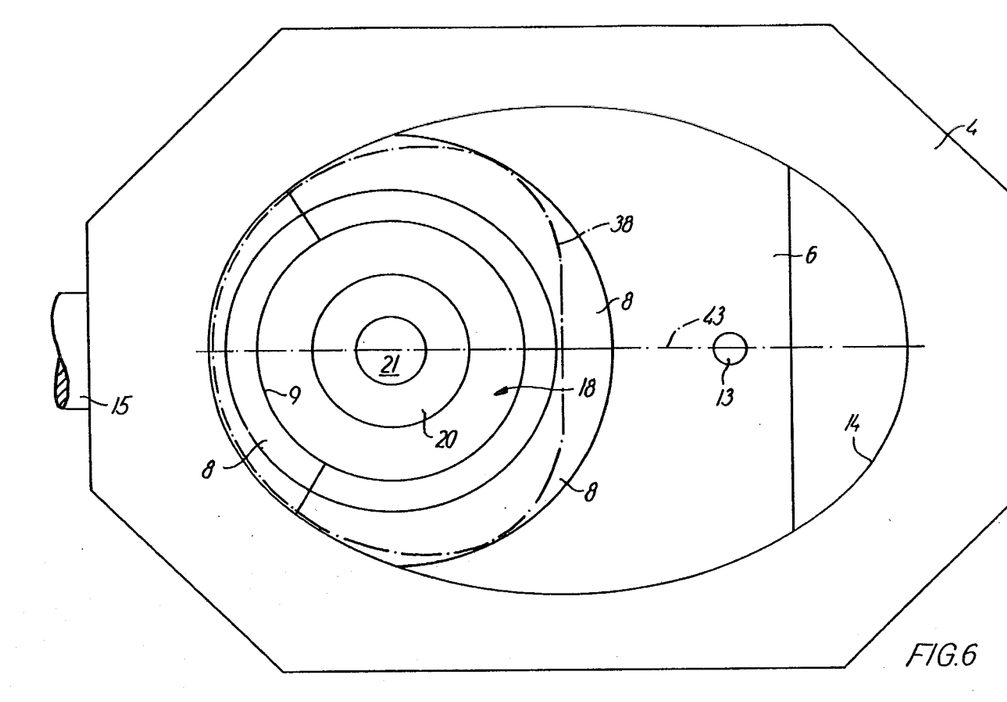
FIG. 6 is a plan view of the lower tool and the ring-shaped blank holder of the pressing equipment.

In FIG. 5 the cross-sectional contour of the finished pressed crank arm is indicated by a dot-and-dash line 37 while the solid lines show the crank arm after machining prior to a welding together of several identical crank arms along the end faces 39 and 40 of the machined stubs 41 and 42 so as to form a complete crankshaft. It will be seen that the method results in a very economical utilization of the amount of material employed to produce a relatively light crank arm with a minimum of material removal by machining while at the same time the above discussed grain flow substantially parallel to the surface, which improves the strength properties of the crankshaft, is obtained in the crank and journal pins and above all in the fillets between the pins and the intermediate portion of each arm.

In a modified method according to the invention one or both of the depresions, which in the embodiment described and shown extend continuously around either extruded stub, may extend only along a fraction of the circumference of the associated stub, more particular along that part of the stub surface which is oriented towards the other stub since it is in these zones of the finished crankshaft that the maximum stresses occur under load. Each part-annular depression extends preferably symmetrical on both sides of the line connecting the center lines of the stubs and indicated in FIG. 6 by a dot-and-dash line 43. The angular length of the depression should be at least 60° at each side of said line, i.e. a total of 120°. With this modification it will be possible to reduce the amount of material to be removed by the subsequent machining of the arm, cf. FIG. 5, by locating the contour of the original blank and the corresponding inner contour of the ring-shaped holder closer to the adjoining stub.

In view of the rather high pressing force required for indenting a depression, especially a continuous annular depression, each depression may be formed in two successive stages. In the first stage there may be employed a flat upper pressing plunger without the pressing mandrel shown in FIGS. 1–2 so that from the underside of the blank there is extruded only a relatively low stub containing the material displaced from the shallow depression formed by the male die part of the lower pressing tool.

I claim:

1. Equipment for press-forging a crank arm with integral crank pin and main journal pin for a welded crankshaft, starting from a blank having two opposed, substantially flat lateral surfaces with a provisional stub protruding from each of said surfaces at the location of the eventual crank pin or main journal pin, respectively; said equipment comprising first and second pressing tools relatively movable towards and away from one another, an aperture in the first pressing tool for receiving one of said provisional stubs, an anvil recessed in the aperture centrally thereof and with a radial clearance from the inner wall of the aperture, a pressing mandrel secured to the second pressing tool and protruding therefrom towards the first pressing tool coaxially with said aperture, said pressing mandrel being formed with transverse dimensions decreasing towards the first pressing tool, and means for stopping the relative movement of the pressing tools towards one another when the end face of the pressing mandrel is spaced a short distance from the end face of the anvil.

2. A pressing equipment as claimed in claim 1, wherein the outer diameter of the anvil is between 40% and 60% of the inner diameter of the surrounding aperture.

3. A pressing equipment as claimed in claim 1 or 2, wherein the pressing mandrel comprises a concave portion, the longitudinal profile of which is shaped substantially as an arc of a circle, said concave portion merging towards the free end of the mandrel into a slightly conical stem.

4. A method of manufacturing a crank arm for a welded crankshaft, comprising providing a blank (5) having two opposed, flat or substantially flat lateral surfaces, heating said blank to forging temperature and forming integral crank pin and journal pin stubs (35, 36), respectively, by extruding material from the blank in opposite directions perpendicular to said lateral surfaces, characterized in that in connection with the extrusion of either stub (35, 36) a depression (23, 27) having a smoothly curved cross-section is press-forged into the adjoining lateral surface of the blank (5) concentric with said stub, which depression extends along the surface of the stub through an angle of at least 60° to either side of the line (43) connecting the centers of the two stubs and merges smoothly into the surface of the stub.

5. A method as claimed in claim 1, characterized in that during the formation of each said depression (23, 27) the blank is restrained against lateral expansion.

6. A method as claimed in claim 1, characterized in that each depression (23, 27) is press-forged simultaneously with a substantially axial extrusion of the associated stub (24, 26) and that each stub is subjected to a combined axial and radial expansion in a subsequent operation.

* * * * *

UNITED STATES PATENT OFFICE
CERTIFICATE OF CORRECTION

Patent No. 4,306,342　　　　　　　　Dated December 22, 1981

Inventor(s) Erik Hansen

It is certified that error appears in the above-identified patent and that said Letters Patent are hereby corrected as shown below:

Claim 5, line 1, change "Claim 1" to read --Claim 4--.

Claim 6, line 1, change "Claim 1" to read --Claim 4--.

Signed and Sealed this

Twenty-third Day of March 1982

|SEAL|

Attest:

GERALD J. MOSSINGHOFF

Attesting Officer　　　Commissioner of Patents and Trademarks